(No Model.)
J. W. DODGE.
Edge Plane for Trimming Boot and Shoe Soles.
No. 240,104. Patented April 12, 1881.
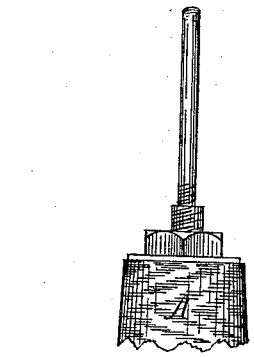
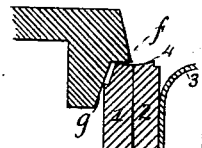
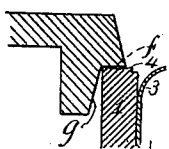
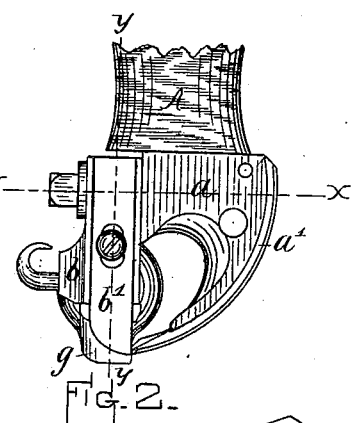
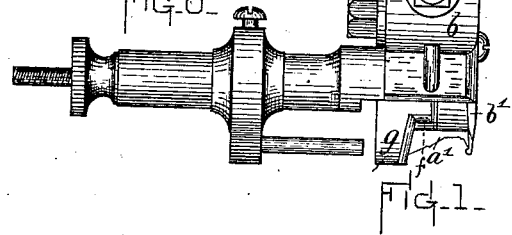
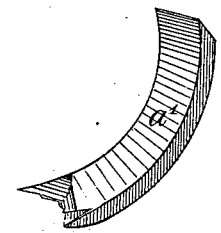
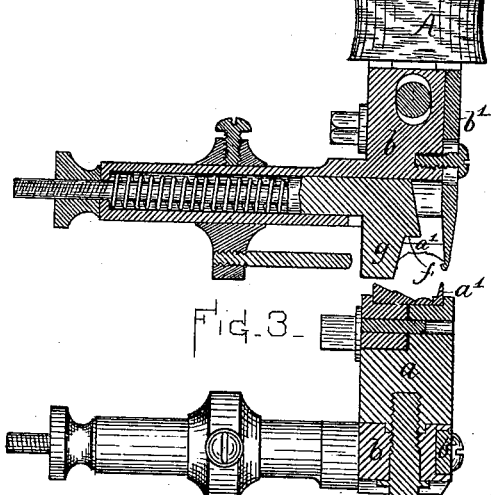
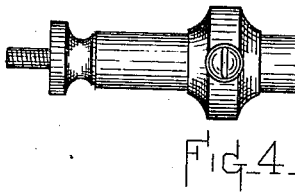
N. PETERS, PHOTO-LITHOGRAPHER, WASHINGTON, D.C.

UNITED STATES PATENT OFFICE.

JOHN W. DODGE, OF MALDEN, MASSACHUSETTS.

EDGE-PLANE FOR TRIMMING BOOT AND SHOE SOLES.

SPECIFICATION forming part of Letters Patent No. 240,104, dated April 12, 1881.

Application filed February 18, 1881. (No model.)

*To all whom it may concern:*

Be it known that I, JOHN WESLEY DODGE, of Malden, in the county of Middlesex and State of Massachusetts, have invented an Improved Edge-Plane for Trimming the Edges of Boot and Shoe Soles, of which the following is a full, clear, concise, and exact description, reference being had to the accompanying drawings, forming a part thereof, in which—

Figure 1 is a front elevation; Fig. 2, a side elevation; Fig. 3, a section on line $y\,y$ of Fig. 2; Fig. 4, a section on line $x\,x$ of Fig. 1; Fig. 5, a perspective view of the knife; Fig. 6, a perspective view of the rand-guide. Figs. 7 and 8 are detail views.

My invention relates to tools for trimming the edges of soles; and it consists, first, in the combination of the stock carrying the knife or knives for trimming the edge, or for both trimming the edge and taking out the rand, with a second stock carrying the gage and rand-guide, the two stocks being adjustable relatively to each other in order to make the cut fine or rank, and the rand-guide being also adjustable on its stock in order that the relation of the rand-guide to the knife may be independent of the relative adjustment of the knife and gage.

The second part of my invention relates to the use of a gage narrower than the sole-edge to be trimmed; and it consists in combining a bottom guard with such a gage and mounting both on a slide, in order that in trimming from the shank over the fore part the narrow gage may be moved sidewise by the bottom guard, for the purpose fully specified below.

The knife $a'$ is held in its stock $a$ in any usual manner, and the stock $a$ is secured to the handle A by a tang in the usual manner. The rand-guide $b'$ and gage $f$ are mounted in the adjustable stock $b$, and the rand-guide is itself adjustable in the stock. The purpose of this is that when the stock $b$ is raised or lowered to adjust the depth of cut, by bringing the gage $f$ into proper relation with the knife $a'$, the rand-guide is also raised or lowered, and requires, therefore, to be readjusted.

I have shown the gage $f$ in one piece with the bottom guard, $g$, as the tool shown is adapted for trimming both the shank and fore part; but, as will be clear to all skilled in the art, the bottom guard, $g$, is not essential, and the gage need not move sidewise when the tool is for trimming the shank alone or the fore part alone.

The main feature of my invention consists in the combination, with the knife and its stock, of an adjustable stock carrying the gage, so that the gage can be adjusted accurately to regulate the depth of cut, and also carrying the rand-guide, which is itself adjustable in this stock, so that after the proper adjustment of the stock and gage the rand-guide can be itself properly adjusted.

Another feature of my invention consists in the combination, with the knife-stock and its knife, of a second stock carrying the rand-guide and a narrow gage and bottom guard, both sliding sidewise on the stock, as shown in the drawings.

In trimming shoes with a half-sole between the outer and inner sole the half-sole often projects beyond the edge of the outer sole, and unless the gage be moved the tool must pass several times over the edge when the tap projects, in order to trim it away sufficiently.

The gage $f$ is no wider than the width of the outer sole, and is controlled by the bottom guard, $g$, and as the tool trims that part of the edge where the tap projects the gage is moved sidewise away from the rand-guide, (by the increased thickness of the sole,) and the projecting part of the half-sole is cut away by one cut, as illustrated in Figs. 7 and 8, which are diagrams illustrating the action of the narrow gage and bottom guard, Fig. 7 showing this action when passsing over a part of the sole-edge when the half-sole projects, 1 being the outer sole, and 2 the projecting half-sole, and 3 the upper. The line 4 shows the line of cut. In Fig. 8 the narrow gage is shown close up to the rand-guide, as it is when trimming through the shank.

What I claim as my invention is—

1. In an edge-plane, the combination of stock $a$, carrying knife $a'$, and the adjustable stock $b$, carrying rand-guide $b'$ and gage $f$, the rand-guide being adjustable on stock $b$, as and for the purpose specified.

2. In an edge-plane, the gage $f$, narrower than the edge to be trimmed, and bottom guard, $g$, both arranged on a slide, whereby the gage $f$ is moved by the action of the bottom guard away from the rand-guide when the tool passes from the thin edge at the shank of the sole to the thicker edge of the fore part, as and for the purpose specified.

JOHN WESLEY DODGE.

Witnesses:
J. E. MAYNADIER,
J. R. SNOW.